May 21, 1963 C. G. HADEK 3,090,184
HYDRAULIC HORIZONTAL SLIDING ACTION GANG MOWER
Filed Nov. 8, 1961 6 Sheets-Sheet 1
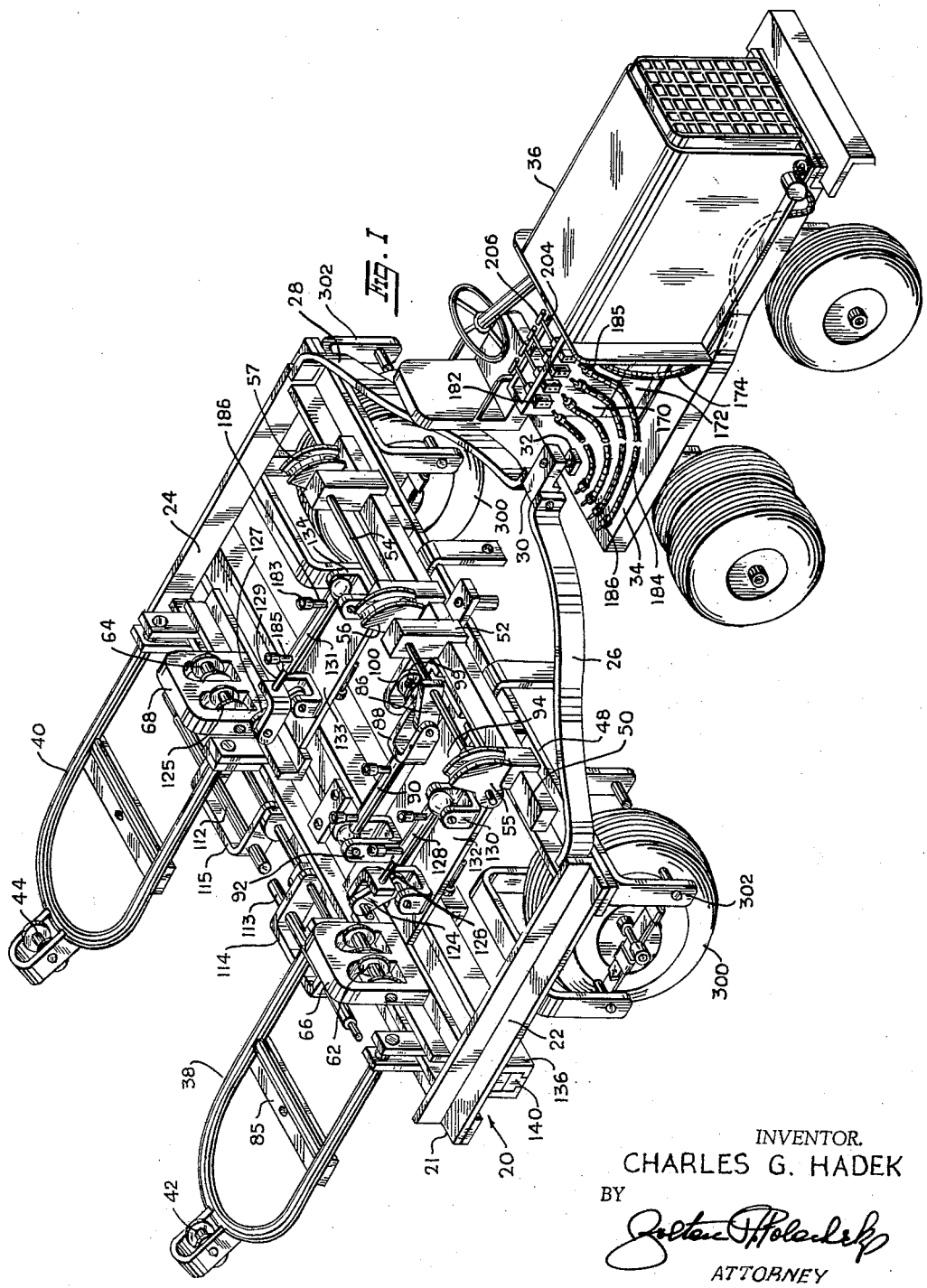
INVENTOR.
CHARLES G. HADEK
BY
ATTORNEY May 21, 1963
C. G. HADEK
3,090,184
HYDRAULIC HORIZONTAL SLIDING ACTION GANG MOWER
Filed Nov. 8, 1961
6 Sheets-Sheet 2
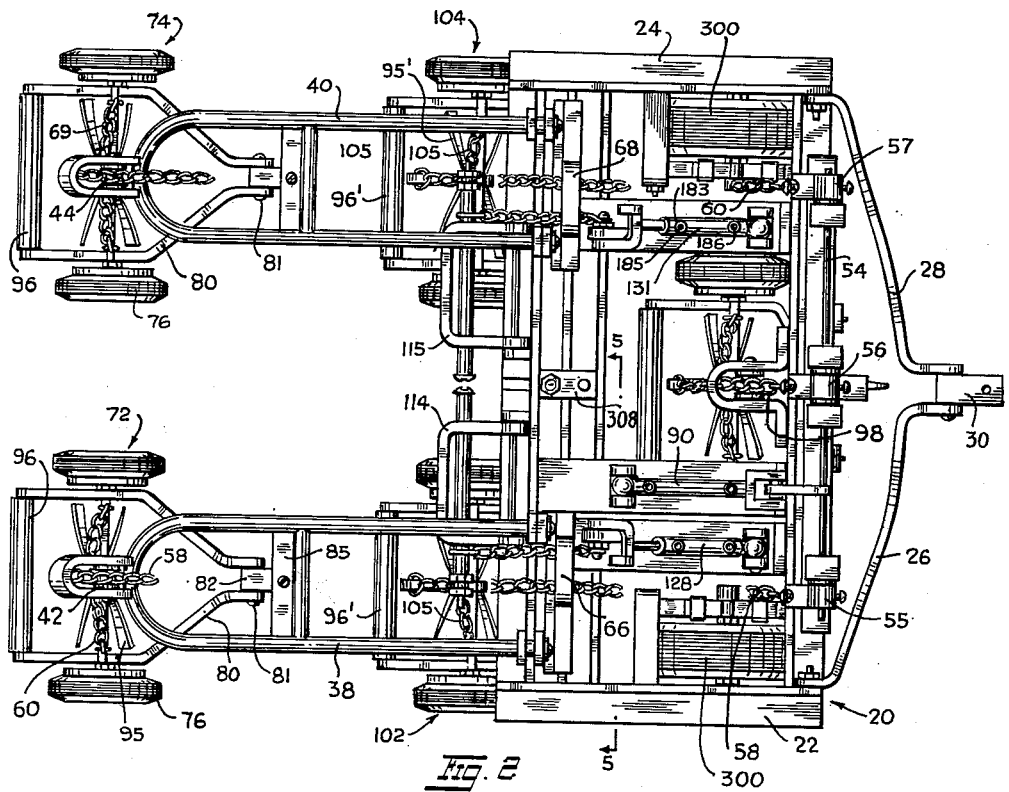
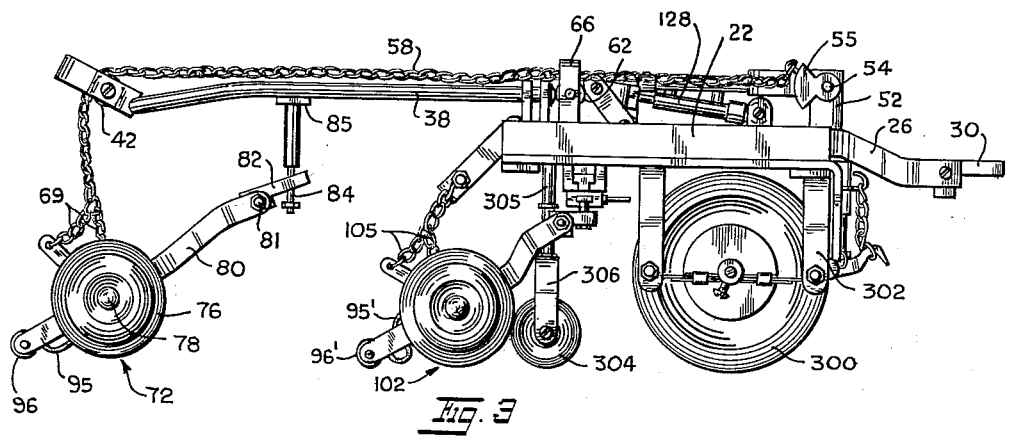
INVENTOR.
CHARLES G. HADEK
BY
ATTORNEY May 21, 1963
C. G. HADEK
3,090,184
HYDRAULIC HORIZONTAL SLIDING ACTION GANG MOWER
Filed Nov. 8, 1961
6 Sheets-Sheet 3
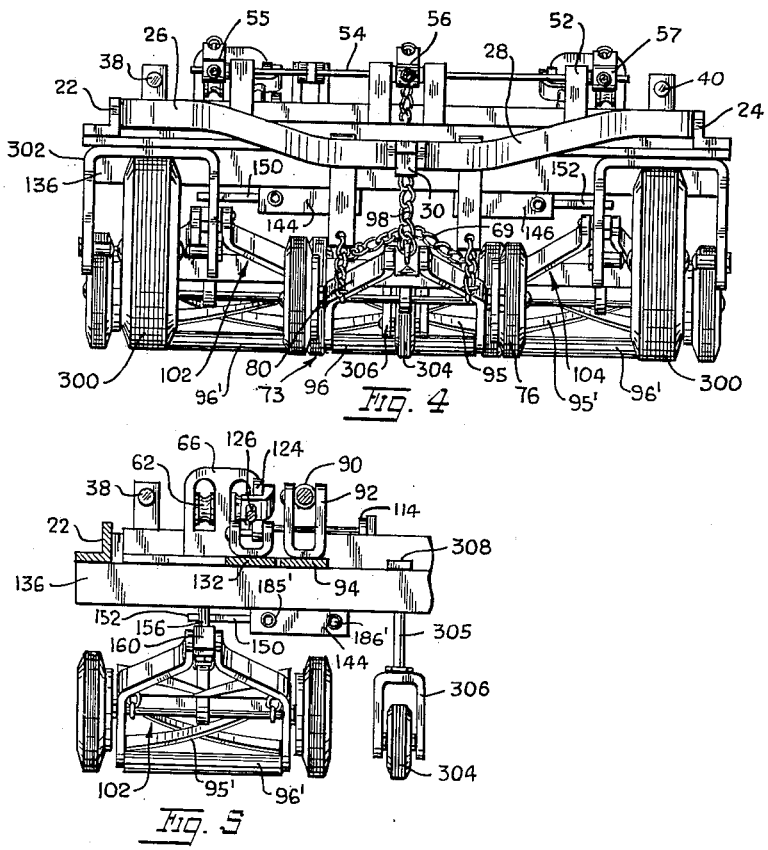
INVENTOR.
CHARLES G. HADEK
BY
ATTORNEY May 21, 1963

C. G. HADEK 3,090,184

HYDRAULIC HORIZONTAL SLIDING ACTION GANG MOWER

Filed Nov. 8, 1961

INVENTOR.
CHARLES G. HADEK
BY
*Jultan Holochek*
ATTORNEY

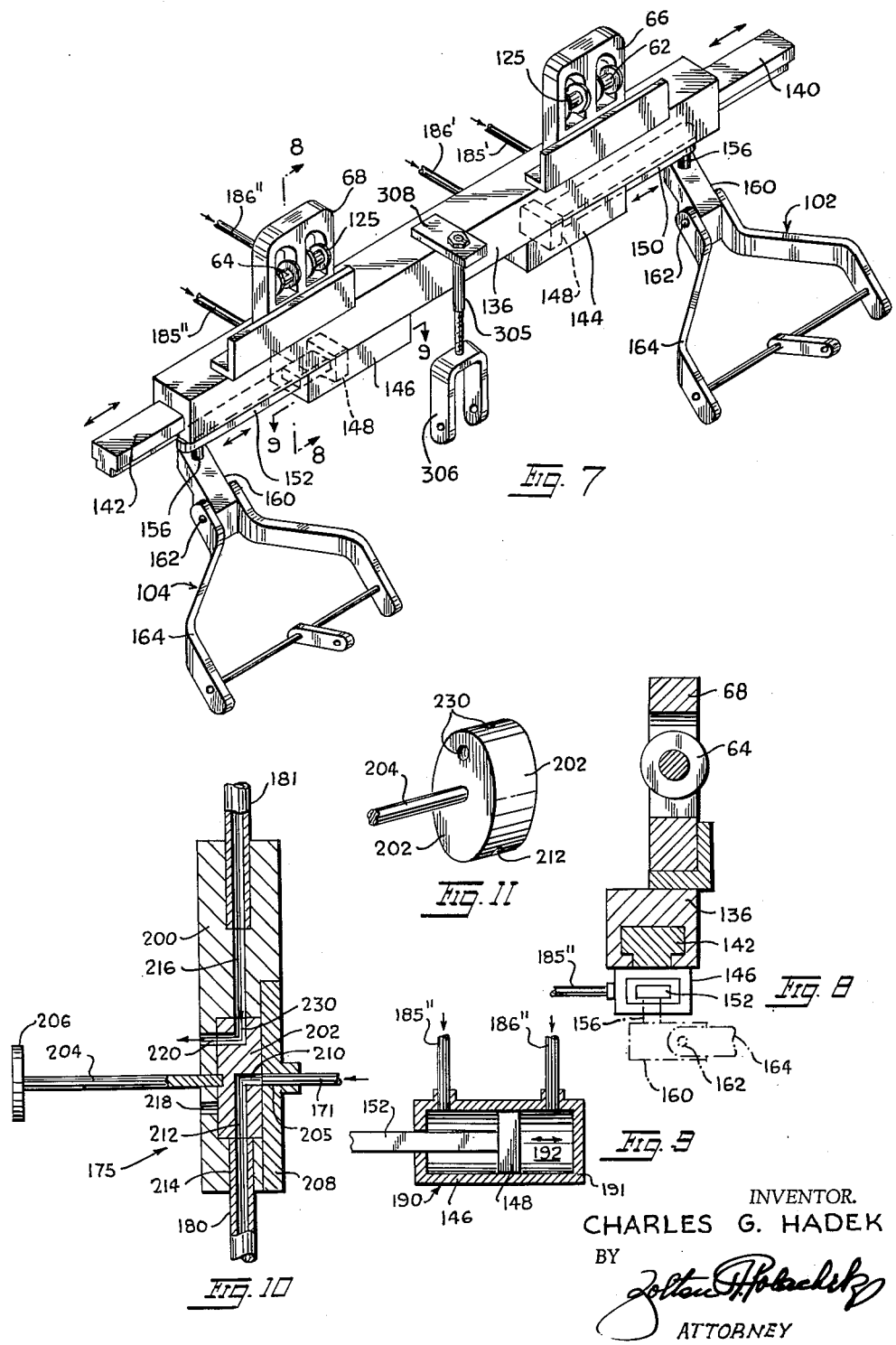

May 21, 1963 C. G. HADEK 3,090,184
HYDRAULIC HORIZONTAL SLIDING ACTION GANG MOWER
Filed Nov. 8, 1961 6 Sheets-Sheet 6

INVENTOR.
CHARLES G. HADEK
BY
ATTORNEY

United States Patent Office 3,090,184
Patented May 21, 1963

3,090,184
HYDRAULIC HORIZONTAL SLIDING ACTION GANG MOWER
Charles G. Hadek, Oyster Bay, N.Y., assignor to George Fisanick, Flushing, N.Y.
Filed Nov. 8, 1961, Ser. No. 150,999
6 Claims. (Cl. 56—7)

This invention relates to the art of mowing implements and machines and particularly concerns a gang mower construction.

According to the invention there is provided a mower having a frame on which are pivotally mounted a plurality of mowing assemblies. The mower has a single centrally mounted mowing assembly at the front and two laterally spaced mowing assemblies at the rear. Between the front and rear assemblies are two laterally spaced mower assemblies carried on a rail and adapted to be moved laterally for adjustably spacing the assemblies. Hydraulically or pneumatically operated means are provided for moving the laterally adjustable assemblies. The several mowing assemblies are arranged so that they can be elevated from the ground by chains operated by means of a hydraulic system. The mower frame is adapted to be attached to a tractor for towing.

It is therefore a principal object of the invention to provide a gang mower having a pair of laterally spaced mower assemblies mounted on a support and laterally adjustable thereon.

A further object is to provide a gang mower as described, wherein the mower includes a hydraulically or pneumatically operated system for adjustably positioning the mower assemblies laterally of each other.

Still another object is to provide a gang mower having mowing assemblies pivotally mounted on a horizontal frame and elevatable by hydraulic or pneumatic means from the ground to positions below the frame.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

FIG. 1 is a perspective view of a partially assembled gang mower and associated pulling tractor.

FIG. 2 is a top plan view of the gang mower, parts of the assembly being omitted.

FIG. 3 is a side elevational view of the gang mower.

FIG. 4 is a front elevational view of the gang mower.

FIG. 5 is a fragmentary sectional view taken on line 5—5 of FIG. 2.

FIG. 7 is an isometric view of a rail mounting for the intermediate laterally movable mowing assemblies, with associated parts for moving the assemblies.

FIGS. 8 and 9 are enlarged sectional views taken on lines 8—8 and 9—9, respectively, of FIG. 7.

FIG. 10 is an enlarged sectional view through a hydraulic control valve.

FIG. 11 is an enlarged perspective view of a valve rotor.

Figure 6:
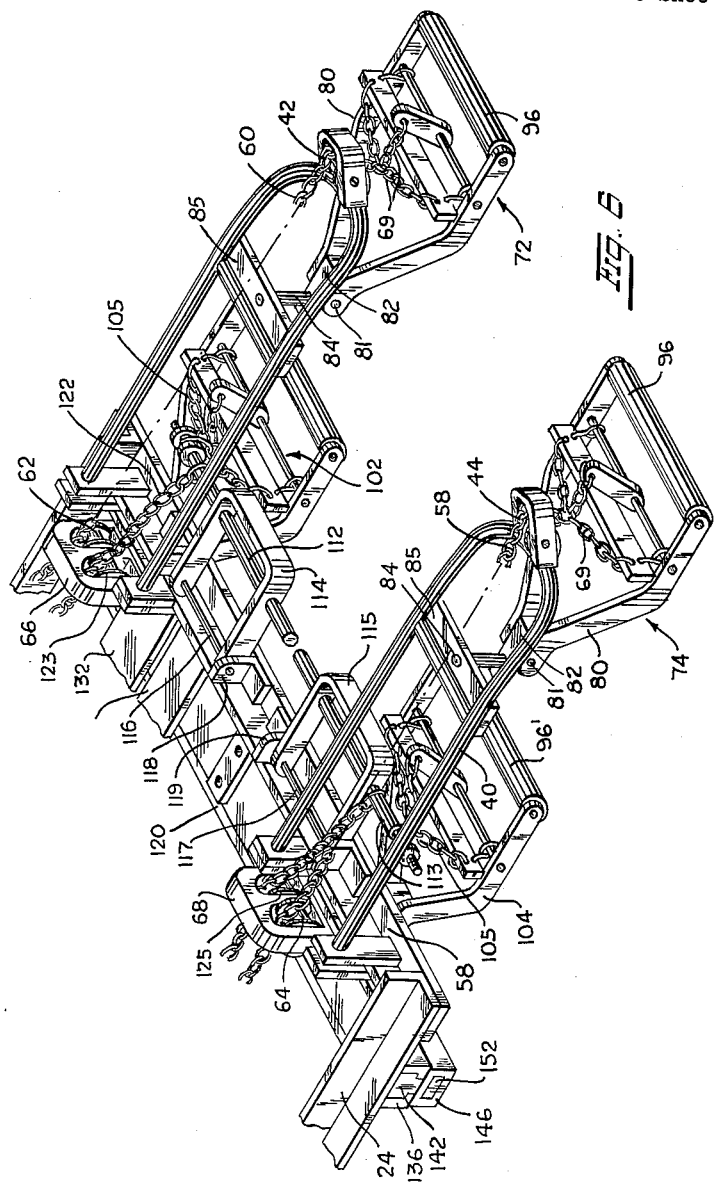
FIG. 6 is a perspective view at the rear of part of the mower frame and associated parts.
Figure 12:
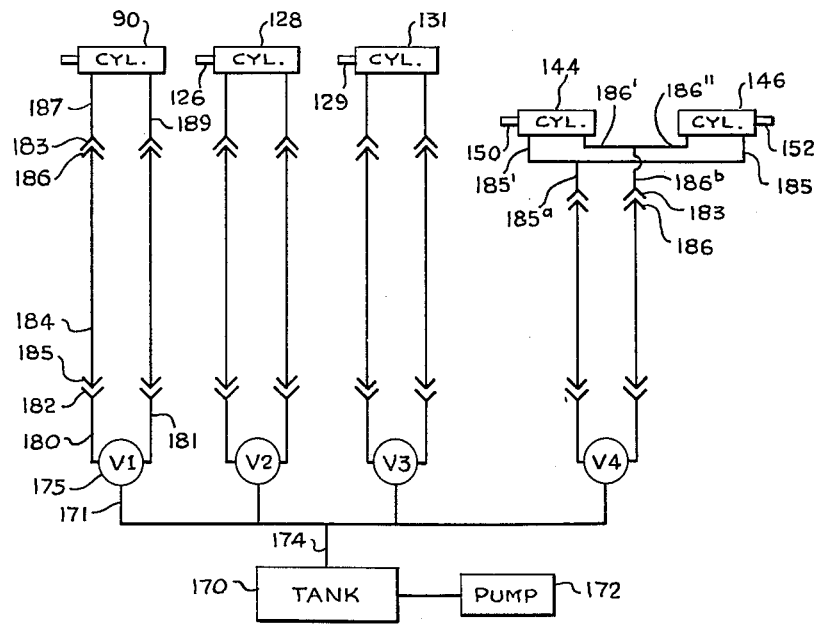

FIG. 12 is a diagram of a hydraulic control system.

Figure 13:
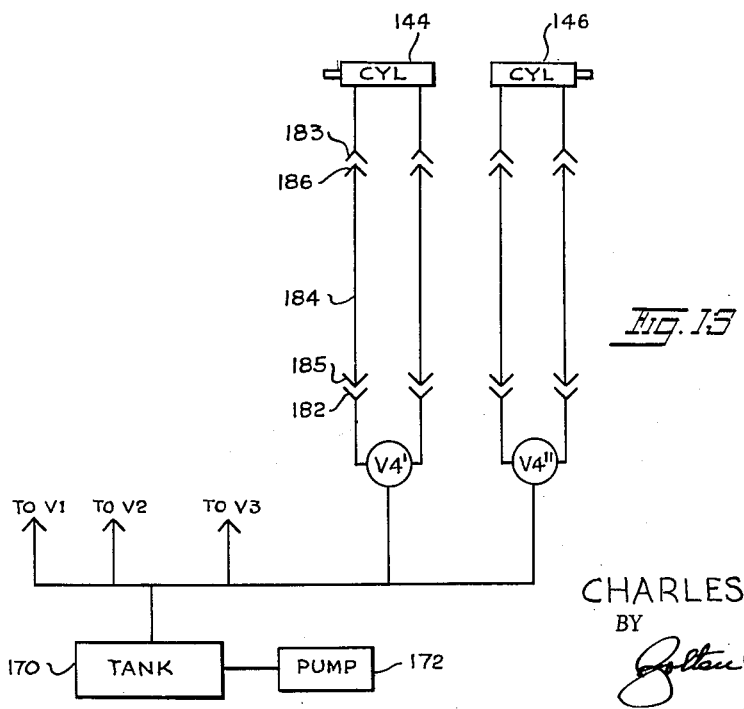

FIG. 13 is a diagram of an alternate hydraulic control system.

Referring to FIGS. 1–6, there is shown the mower 20. The mower includes a horizontal frame 21 formed by laterally spaced, parallel angle bars or rails 22, 24 secured to forwardly and inwardly extending bars 26, 28. Bars 26, 28 are pivotally joined at their facing forward ends to a towing block 30. Block 30 can be engaged on a swivel joint 32 mounted on platform 34 of a tractor 36. The frame 21 has two rearwardly extending, horizontal inverted U-shaped frame members 38, 40 provided with pulleys 42, 44 at the rear ends of their bights. The frame has a forward crossbar 48 on which is mounted a rail 50 provided with upstanding bearing brackets 52. A shaft 54 is rotatably mounted in the brackets above the rail 50. Three sector pulleys 55, 56 and 57 are secured to the shaft and are angularly tiltable therewith. Chains 58 and 60 are secured to the two most laterally spaced pulleys 55, 57. These chains are passed over outer pulleys 62, 64 carried in upstanding pulley brackets 66, 68 at the rear of the frame. The chains then pass over pulleys 42, 44 and respectively engage three chains 69 arranged to elevate and lower mower blades 95 and roller 96 of rear mower assemblies 72, 74.

Each of the rear mower assemblies has road wheels 76 carried on a shaft 78. Two frame bars 80 are attached to shaft 78. The forward ends of the frame bars are pivotally carried on horizontal pin 81 secured to a pivot block 82. Pivot block 82 in turn pivots on a vertical pin 84. Each of the two pins 84 is secured to a transverse bar 85 extending across one of frame members 38, 40.

A lever arm 86 is secured to shaft 54. This arm is engaged in the forked end 88 of a piston slidably mounted in a hydraulic cylinder 90. The rear end of cylinder 90 is pivotally mounted on trunnions 92 carried upon a frame plate 94.

Front mower assembly 73 is similar in construction to assemblies 72 and 74 with wheels 76, blades 95, roller 96 and frame bars 80. The three chains 69 of this assembly are secured to chain 98 which passes upwardly over a pulley 99 carried by a horizontal pulley bracket 100. Chain 98 is secured to pulley 56.

Two intermediate mower assemblies 102 and 104 are provided for the mower. These assemblies are located between the forward and rear assemblies 72—74. Each of assemblies 102, 104 is provided with three chains 105 for elevating the roller 96' and blades 95' of the assembly. Attached to the three chains 105 of assembly 102 is a link connected to the outer end of a horizontal shaft 112. Shaft 112 is carried by a U-shaped frame member 114 pivotable on a horizontal shaft 116 carried in bearing brackets 118 on a transverse frame bar 120. The three chains of assembly 104 are connected by a link to the outer end of a horizontal shaft 113 carried by another U-shaped frame member 115 pivotable on a horizontal shaft 117. Shaft 117 is carried in bearing brackets 119 on frame bar 120.

A single chain 122 is connected at one end to shaft 112 and passes over inner pulley 123 in pulley bracket 66. The chain 122 terminates at a lever arm 124 pivotally secured to piston 126 of a hydraulic cylinder 128. The forward end of the cylinder 128 is pivotally secured in a bearing bracket 130 on frame plate 132.

Single chain 123 is connected at one end to shaft 113 and passes over inner pulley 125 in pulley bracket 68. Chain 123 terminates at a lever arm 127 pivotally secured to the outer end of a piston 129 of hydraulic cylinder 131. The forward end of the cylinder 131 is pivotally secured in a bearing bracket 134 on frame plate 133.

Extending across the frame of the mower and secured to angle bars 22, 24 is an inverted channel bar 136. Movable in this bar are two aligned short rails 140, 142 each having a T-shaped cross section; see FIGS. 1, 7 and 8. Secured to the underside of the bar 136 are two rectangular hydraulic double acting cylinders 144, 146. Each of the cylinders includes a piston 148 shown in FIG. 9. Attached to the pistons 148 of the cylinders 144, 146 are axially aligned piston shafts 150, 152. These shafts extend transversely of the mower. Posts 156 are secured to and extend downwardly from the respective rails 140, 142. Posts 156 are vertical. Pivot blocks 160 are pivotally engaged on the respective posts. These blocks carry horizontal pins or shafts 162 on which are pivotally engaged the forward ends of frame members 164 forming parts of the two intermediate assemblies 102, 104 which have the same width as the forward and rear assemblies 72, 74. The forward assembly 73 is wider than the spacing between the rear assemblies 72, 74 so that the inner ends of assemblies 72, 74 overlap the outer ends of assembly 73.

The mower as described will mow a fixed width of terrain determined by the fixed spacing of the outer ends of mower assemblies 72, 74. In addition, the intermediate mower assemblies permit extending or varying the width of the mower to determine the width of terrain which the mower will mow.

The frame is movably supported underneath by two main road wheels 300 located at opposite sides of the frame and journaled in inverted U-shaped brackets 302 secured to the frame. Another centrally located road wheel 304 may be provided under the frame. This wheel has a vertical shaft 305 secured to its journal bracket 306. The shaft 305 is secured to a plate 308 extending horizontally and rearwardly of channel bar 136; see FIG. 7.

FIGS. 1 and 12 illustrate schematically the hydraulic system of the mower. A tank 170 is charged with compressed air or other gas or fluid by a pump 172 which will be carried by the tractor 36. Fluid line 174 extends from the tank to the inlet conduit 171 of each of four valves 175 respectively designated V1–V4. The valves have dual outlets 180, 181. Suitable snap fit socket connectors 182 may be provided at the ends of the outlets 180, 181. Flexible pipes 184 having snap fit plugs 185, 186 at opposite ends detachably connect with socket connectors 182 and with socket connectors 183 secured to the ends of conduits 187, 189 terminating at opposite ends of cylinders, respectively designated 90, 128, 131, 144, 146. Outermost conduits 185' and 185'' of cylinders 144, 146 are connected together to conduit 185ᵃ. Innermost conduits 186' and 186'' of these cylinders are connected together to conduit 186ᵇ. The piston shafts 150, 152 of the cylinders 144, 146 extend in opposite directions as previously described.

FIG. 9 shows details of the construction of double acting cylinder 146. The cylinder 144 is similarly constructed. The cylinder 146 has an outer casing 190, with an internal cylindrical cavity 192 closed by head 191. Piston 148 is axially movable in the cavity and to this piston is connected shaft 152. Conduits 185'' and 186'' communicate with opposite ends of the chamber or cavity 192. Air or other fluid which is supplied to the cylinder from either one of the conduits 185'', 186'' will move the piston and the fluid will pass out of the other conduit to the associated control valve V4. Cylinders 90, 128 and 131 have round casing but are otherwise similar to cylinders 144, 146.

FIGS. 10 and 11 show a construction for valves 175. The valve includes a stationary body 200 in which is a rotatably mounted valve core 202. The core is turnable by a shaft 204 to which is attached a handle 206. Conduit 171 communicates through a bore 205 in cover plate 208 with axial bore 210 in the core. The core has a radial bore 212 communicating with bore 210. By turning the shaft and core, bore 212 can be aligned with either one of diametrically opposed bores 214 and 216 in the valve. Conduits 180, 181 are connected to and communicate with the bores 214, 216, respectively. Exhaust bores 218, 220 are formed in the side of body 200 and one or the other of these bores communicates with a right-angled bore 230 formed in the core. When bore 212 communicates with either bore 214 or 216, then the other bore 216 or 214 is open to atmosphere through bore 218 or 220.

If the core 202 is turned so that none of the conduits 180, 181 connects directly with the inlet conduit 171, then the air or other fluid is trapped in the associated cylinders 90, 128, 131, 144 or 146, and the piston therein cannot move.

In operation of the mower, the operator may actuate valve V1 to actuate the piston 91 of cylinder 90. This will turn lever arm 86 and rotate shaft 54 to retract or advance chains 58, 60 and 98 simultaneously. The retraction of the chains will elevate the rollers and mower blades of the associated front and rear mower assemblies 72—74 from the ground. Advancement of the chains will lower the rollers and blades and position the mower assemblies for mowing operation.

If the operator actuates valves V2 or V3, then the piston in the associated cylinder 128 or 131 will be moved and the roller and blades of intermediate mower assemblies 102 or 104 will be lowered or elevated. While the assemblies 102 and 104 are elevated, the operator can operate valve V4 to cause both piston shafts 150, 152 in cylinders 144, 146 to extend or retract to position the rollers and blades of the intermediate assemblies. When the valve core of valve V4 blocks the cylinders 144, 146 from communication with the tank, then the intermediate assemblies will be locked in the selected lateral position. Thereafter, either valve V2 or V3 or both can be operated to lower either or both of the assemblies to place their rollers and blades in operative mowing position. The system is arranged so that both mower assemblies 144 and 146 move laterally in and out with respect to the frame simultaneously. It is, of course, possible to connect the cylinders 144 and 146 to individual valves arranged like valves V1–V3 shown in FIG. 12, so that assemblies 102 and 104 are individually laterally positionable. This is shown in FIG. 13 wherein valve V4' controls cylinder 144 and valve V4'' controls cylinder 146.

The invention makes it possible for an operator to mow a variable width of terrain by adjustably positioning the intermediate mower assemblies. The several assemblies are so arranged that when elevated they do not project above the horizontal frame. This provides a low-lying assembly which can pass over low hanging tree branches. The positioning of the intermediate mower assemblies can be precisely set within an inch of desired position for cutting close to trees, fences, and the like, and making unnecessary successive passes with the mower as is required with other known types of mowers. It will be understood that the invention might be applied to gang farm plows, rakes, seed drills and the like.

While I have illustrated and described the preferred embodiment of my invention, it is to be understood that I do not limit myself to the precise construction herein disclosed and that various changes and modifications may be made within the scope of the invention as defined in the appended claims.

Having thus described my invention, what I claim as new, and desire to secure by United States Letters Patent is:

1. In a gang mower having a pair of spaced mower assemblies displaceable laterally, mechanism for moving said mower assemblies in opposite directions including two hollow cylinders, axially disposed pistons movable in said cylinders, shafts connected to said pistons, one end of said shafts protruding outwardly of the cylinders, a channel-shaped rail associated with each cylinder, a T-shaped bar slidably mounted in each rail, and posts depending from one end of said shafts, the other end of the posts connected to said mower assemblies and means for supplying fluid to both ends of said cylinders.

2. In a gang mower, a horizontal rectangular frame, a pair of mower assemblies spaced laterally from each other underneath the frame, said mower assemblies each including a roller and mower blades, wheel means supporting said frame, means pivotally attaching said assemblies to the frame, hydraulically operated means operatively connected to said assemblies for elevating and lowering said roller and mower blades, further hydraulically operated means operatively connected to said assemblies for laterally displacing the same, said further means including two cylinders having pistons engaged with the respective assemblies, a source of pressurized fluid, and valve means in circuit with said source and cylinders for actuating said pistons, said valve means including a pair of valves respectively connected via separate conduits to the two cylinders, whereby each assembly is laterally displaceable independent of the other assembly.

3. In a gang mower and the like, a horizontal rectangular frame, a pair of mower assemblies spaced laterally from each other underneath the frame, said mower assemblies each including a roller and mower blades, wheel means supporting said frame, means pivotally attaching said assemblies to the frame, hydraulically operated means operatively connected to said assemblies for elevating and lowering said roller and mower blades, further hydraulically operated means operatively connected to assemblies for laterally displacing the same, said further means including two cylinders having axially movable pistons with piston shafts extending out of the cylinders, a channel-shaped rail mounted underneath the frame, T-shaped bars slidably supported in said rail, posts extending downwardly from said bars and connected to said assemblies, said piston shafts being engaged with said posts, a source of pressurized fluid, and valve means in circuit with said source and cylinders for actuating said pistons.

4. In a gang mower, a horizontal rectangular frame, a pair of mower assemblies spaced laterally from each other underneath the frame, said mower assemblies each including a roller and mower blades, wheel means supporting said frame, means pivotally attaching said assemblies to the frame, hydraulically operated means operatively connected to said assemblies for elevating and lowering said roller and mower blades, further hydraulically operated means operatively connected to said assemblies for laterally displacing the same, said further means including two cylinders having axially movable pistons with piston shafts extending out of the cylinders, a channel-shaped rail mounted underneath the frame, T-shaped bars slidably supported in said rail, posts extending downwardly from said bars and connected to said assemblies, said piston shafts being engaged with said posts, a source of pressurized fluid, and valve means in circuit with said source and said cylinders for actuating said pistons, said valve means including a pair of valves respectively connected via separate conduits to the two cylinders, whereby each assembly is laterally displaceable independently of the other assembly.

5. A gang mower, comprising a horizontal rectangular frame, said frame having a pair of laterally spaced U-shaped frame bars extending horizontally and rearwardly of the frame, a first pair of mower assemblies pivotally connected to said frame bars, a second pair of mower assemblies spaced laterally from each other and pivotally connected to portions of said frame intermediate forward and rear ends thereof, a single further mower assembly centrally and pivotally connected to the forward end of the frame, each of said mower assemblies including a roller and mower blades, chains respectively connected to said mower assemblies, valve controlled hydraulic means operatively connected to said chains for elevating and lowering the rollers and blades of selected ones of said mower assemblies, means for laterally displacing said second pair of mower assemblies both within and beyond the outermost spacing of the first pair of mower assemblies, the last-named means comprising a channel rail extending transversely across the frame, a pair of short bars slidably mounted in said rail, posts extending from said bars respectively engaged with said second mower assemblies, fluid containing cylinders having pistons engaged operatively with said shafts, a pressurized source of fluid communicating with said cylinders for actuating said pistons, and valve means in circuit with said cylinders and said source for controlling the supply of said fluid to said cylinders, said valve means including a single valve connected via common conduits to both of said cylinders for displacing both assemblies of said second pair of assemblies simultaneously while the blades and rollers thereof are elevated.

6. A gang mower, comprising a horizontal rectangular frame, said frame having a pair of laterally spaced U-shaped frame bars extending horizontally and rearwardly of the frame, a first pair of mower assemblies pivotally connected to said frame bars, a second pair of mower assemblies spaced laterally from each other and pivotally connected to portions of said frame intermediate forward and rear ends thereof, a single further mower assembly centrally and pivotally connected to the forward end of the frame, each of said mower assemblies including a roller and mower blades, chains respectively connected to said mower assemblies, valve controlled hydraulic means operatively connected to said chains for elevating and lowering the rollers and blades of selected ones of said mower assemblies, means for laterally displacing said second pair of mower assemblies both within and beyond the outermost spacing of the first pair of mower assemblies, the last-named means comprising a channel rail extending transversely across the frame, a pair of short bars slidably mounted in said rail, posts extending from said bars respectively engaged with said second mower assemblies, fluid containing cylinders having pistons engaged operatively with said shafts, a pressurized source of fluid communicating with said cylinders for actuating said pistons, and valve means in circuit with said cylinders and said source for controlling the supply of said fluid to said cylinders.

References Cited in the file of this patent
UNITED STATES PATENTS

| | | |
|---|---|---|
| 1,235,649 | Braun | Aug. 7, 1917 |
| 2,153,876 | Roseman | Apr. 11, 1939 |
| 2,525,047 | Sawtelle et al. | Oct. 10, 1950 |
| 2,672,000 | Speiser | Mar. 16, 1954 |
| 2,725,703 | Roseman | Dec. 6, 1955 |
| 2,767,995 | Stout | Oct. 23, 1956 |